(12) United States Patent
Roberts

(10) Patent No.: US 6,312,740 B1
(45) Date of Patent: Nov. 6, 2001

(54) METHOD AND APPARATUS FOR ELECTROSTATICALLY APPLYING AN EDIBLE COATING TO A FOOD PRODUCT ITEM

(76) Inventor: James K. Roberts, 8257 E. Del Cadena, Scottsdale, AZ (US) 85258

( * ) Notice: Subject to any disclaimer, the term of this patent is extended or adjusted under 35 U.S.C. 154(b) by 0 days.

(21) Appl. No.: 09/448,193

(22) Filed: Nov. 23, 1999

(51) Int. Cl.$^7$ ............................. A23B 4/00; A23B 4/044
(52) U.S. Cl. ....................... 426/89; 426/289; 427/460; 118/626; 118/629; 99/451
(58) Field of Search ................. 426/89, 289; 427/458, 427/460; 118/626, 629; 99/451

(56) References Cited

U.S. PATENT DOCUMENTS

| | | | |
|---|---|---|---|
| 3,828,729 | * | 8/1974 | Goodridge ........................... 118/634 |
| 4,169,903 | * | 10/1979 | Scholes .................................. 427/28 |
| 4,296,142 | * | 10/1981 | Vasudevan et al. ................... 427/28 |
| 4,702,932 | | 10/1987 | Cosentino et al. ..................... 427/33 |
| 5,356,577 | * | 10/1994 | Boldis et al. ....................... 264/40.7 |
| 5,846,587 | * | 12/1998 | Kelly et al. ........................... 426/289 |
| 6,054,154 | * | 4/2000 | Wang .................................... 426/92 |

* cited by examiner

Primary Examiner—Nina Bhat
(74) Attorney, Agent, or Firm—Cahill, Sutton & Thomas P.L.C.

(57) ABSTRACT

A method and apparatus, for applying electrostatically charged particles of an edible coating material to a surface of a food product to be coated, incorporates a fluidizing hopper for containing the material. The hopper includes an agitating system including an agitator blade and lifting blades to stir and lift the material while air is forced through a microporous fluidizing plate into the material. The fluidized material is withdrawn from the hopper through a venturi pump and supplied to an application gun. The application gun includes a corona discharge through which the fluidized material is forced to create charged particles of the fluidized material. The fluidized particles are directed to a food product item to be coated. The quantity of coating material is predetermined and is precisely controlled by shutting off the air pressure supply to the venturi pump to avoid excessive overspray of the particles. Particle size and material specific gravity are chosen to permit effective coating of the food product item; prefluidizing hoppers are used to prefluidize the coating material and to be substituted for hoppers in the food processing room to facilitate the continuation of the coating process.

21 Claims, 6 Drawing Sheets

METHOD AND APPARATUS FOR ELECTROSTATICALLY APPLYING AN EDIBLE COATING TO A FOOD PRODUCT ITEM

FIELD OF THE INVENTION

The present invention pertains to apparatus and methods for electrostatically coating surfaces, and more particularly to coating surfaces of food products with an edible coating material.

BACKGROUND OF THE INVENTION

The use of electrostatic techniques for coating surfaces is well known in the art. Typically, electrostatic techniques are used for paint coating wherein the powdered "paint" material is pneumatically forced through an electric field to cause the particles of the material to become charged. These particles are then directed to a target having an opposite charge. The electrostatic attraction between the target and the respective particles causes the powder to change its direction and flow around the target to contact exposed surfaces. In this manner, it is possible to obtain complete coverage of an exposed target surface and create a bond between the powder and the target. If the target is completely covered by previously applied or attracted particles, then the excess powder particles are allowed to simply fall to a conveyor or floor of the processing area to later be collected and reused.

In prior art painting operations, such over-spraying does not represent a problem since the systems are designed to incorporate an overspray to insure complete coverage of the target area and the excess powder is simply recycled and reused. Since the materials used in such operations are reusable, and since there is no consideration given concerning the possibility of bacterial growth, these prior art techniques are completely satisfactory. Typically, this prior art painting operation results in a forty percent to fifty percent excess paint powder that is injected into the operative coating area. Using normal exhaust systems and excess spray collection systems, the excess powder dissipates its charge and falls into a collection container at the base of the system, such as a hopper or a bin, and is carried back to the feed hopper and reintroduced for coating.

The application of such prior art systems to the coating of edible products with an edible coating results in the exposure of the excess spray to the possible growth of bacteria. Typical regulations governed by federal agencies require food handling facilities to be kept clean including machinery that is thoroughly cleaned (sometimes several times a day) to prevent the possibility that substances could accumulate and become bacterial breeding grounds. Further, typical food processing plants are labor intensive that would militate against permitting over-spray or excess powder to be released into the workplace. Therefore, prior art electrostatic coating technology fails to provide the necessary assurance against bacterial infestations and environmental cleanliness.

SUMMARY OF THE INVENTION

The present invention provides a method and apparatus for applying electrostatically charged particles of an edible coating material to a food surface to be coated. The coating material is placed in a fluidizing hopper on a fluidizing plate having pressurized air passing through the plate to partially fluidize the material. The material is also fluidized through the use of an agitator system incorporating an agitator blade and lifting blades which lift and stir the fluidized coating material. A venturi tube is positioned at a predetermined precise distance above the fluidizing plate within the hopper to withdraw the fluidized coating material at a predetermined density. The fluidized material is withdrawn through the venturi tube, is then finely adjusted to a precise density and supplied to an application gun. The particles of the fluidized material pass through a corona discharge provided at the exit of the application gun and are directed toward the target. The individual particles thus become electrostatically charged and are attracted to the oppositely charged target. A controller provides the necessary filtered and pressurized air to the system and also provides electrical power to the gun for creating the electrostatic field or corona. The amount of coating material required for the individual targets is predetermined (and may be determined empirically) and the controller is set to precisely shut off the flow of fluidized material from the hopper to the gun at a value equal to the predetermined amount. The present invention also provides for the prefluidization of the material through use of plural hoppers that are operated in an area remote from the food processing area to permit the fluidization of the coating material to be stabilized at a desired density distribution in the hopper prior to the connection of the individual hopper to the coating system. The prefluidizing step is facilitated through the utilization of quick disconnect couplers to enable the hopper to be rapidly changed to thereby avoid significant delays in the coating process.

BRIEF DESCRIPTION OF THE DRAWINGS

The present invention may more readily be described by reference to the accompanying drawings in which.

DETAILED DESCRIPTION OF THE INVENTION

Figure 1:
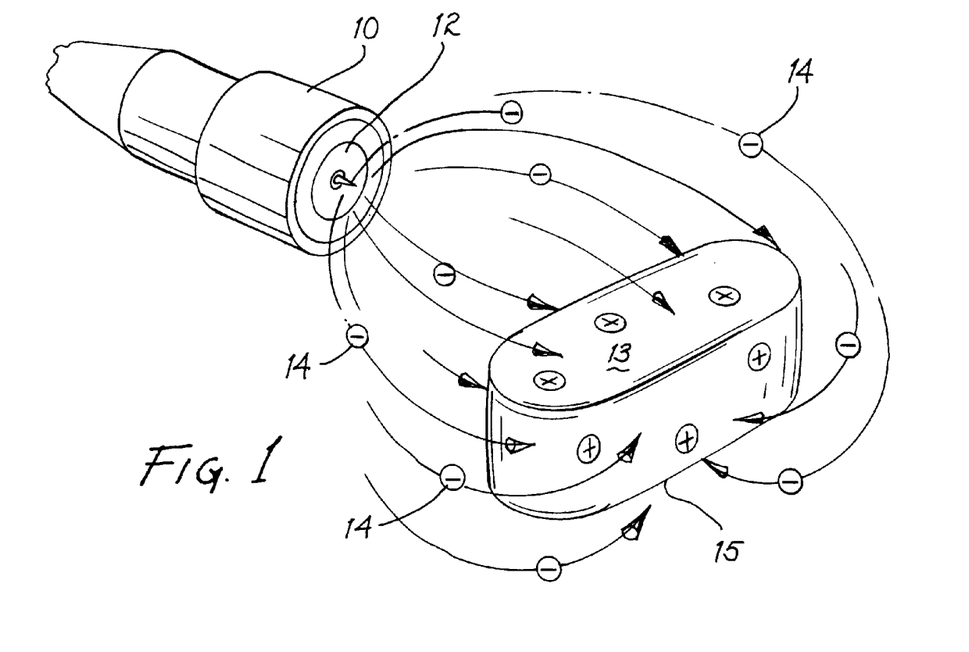
FIG. 1 is a schematic representation of charged particles of a coating material traveling from an application gun to a target useful in describing the operation of the system of the present invention.
Figure 2:
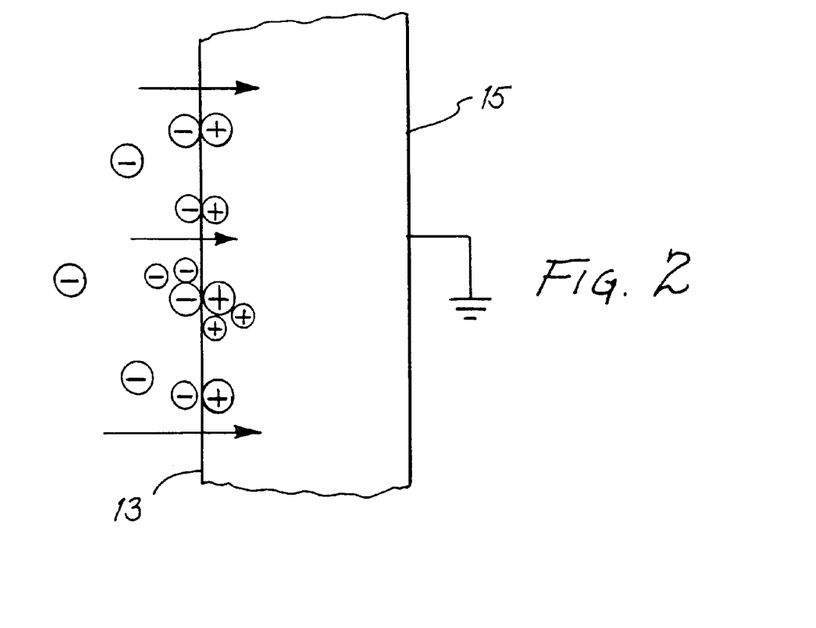
FIG. 2 is a schematic illustration of negatively charged particles of coating material being attracted to an oppositely charged surface useful in describing the operation of the present invention.

Referring now to FIGS. 1 and 2, when fluidized material such as a powder having particles is conveyed through the application gun 10 and passes through a corona field 12, each of the individual particles of the powdered material is separated from the others, and an electron attaches to each particle; the particles thus become negatively charged. Since the particles are each negatively charged, they are mutually repulsed and are propelled by the flow of the air in which they are entrained into the vicinity of target surfaces 13 of a target 15 to be coated. The particles impinge on the respective surfaces 13 of the target 15 and will search out and attach to any exposed surface of the target 15. When the target is completely covered with the negatively charged particles, subsequent negatively charged particles are repelled and the surface, while it is completely coated, will no longer accept additional negatively charged particles. It may be noted here that the discussion has been in terms of negatively charged particles and positively charged target surfaces; it should be understood that the surface of the target 15 may be at ground potential thus making the surface positive with respect to the negatively charged particles. In fact, in food production facilities, the target 15 may take the form of a food article such as a ham which rides upon a conveyer that is grounded. Thus, the surfaces of the target will be at ground potential and therefore positive with respect to the negatively charged particles of the coating material.

The negatively charged particles 14 are thus propelled by force of the air stream in which they are entrained toward the target 15 and attach themselves to the relatively positively charged surfaces 13 of the target 15. It may be noted that it is possible for the target 15 to have surfaces that are relatively more "positive" than other target surfaces. Such circumstances occur when foods such as cut hams are presented for coating. Under such circumstances the exposed open face of the ham presents a more positive target to the negatively charged particles and thus more rapidly attracts the charged particles of the coating. The desired amount of coating material to insure complete coating of the exposed surface of the cut ham may be calculated or determined empirically, and the amount of coating material permitted to flow to the target cut off when that predetermined amount has been discharged through the application gun to thereby permit selective coating of the exposed open cut ham surface without coating the remainder of the ham.

Figure 3:
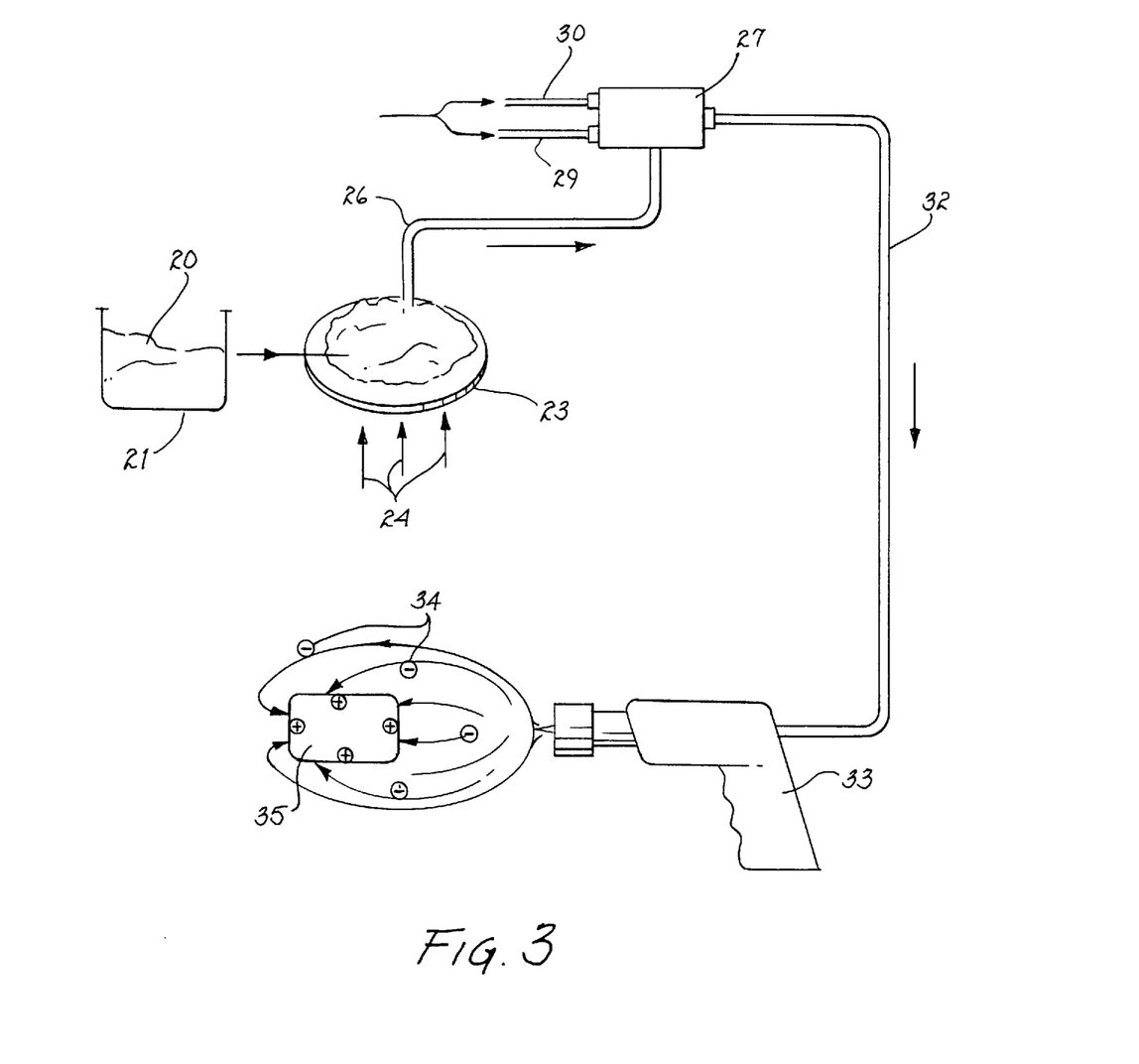
FIG. 3 is a simplified schematic representation of an electrostatic coating process useful for describing the present invention.

Referring now to FIG. 3, a simplified diagram of an electrostatic coating system is shown. A coating material in the form of a powder 20 is transferred from a container 21 to the fluidizing plate 23 that is contained within a hopper (not shown in FIG. 4). The fluidizing plate is a readily available microporous plate that permits pressurized air to pass through its microscopic pores but will not allow coating particles (which are larger) to pass. Pressurized air is forced through the fluidizing plate in the direction shown by the arrows 24 resulting in the fluidizing of the powder, that is, the suspension of the powder in the air passing through the fluidizing plate. This fluidized material is withdrawn through a venturi tube 26 by a venturi pump 27 which also receives primary and secondary air through input tubes 29 and 30, respectively. The primary and secondary air are regulated to produce a fluidized material having the proper density for the application at hand. The fluidized material is transported pneumatically through a tube 32 to an application gun 33. In the application gun, the individual particles are forced through an electric field of a corona discharge to thereby become negatively charged as indicated by the schematic particles 34. The particles mutually repel each other and thus remain separated from other particles as they are transported by the air flow to the vicinity of the target 35.

Figure 4:
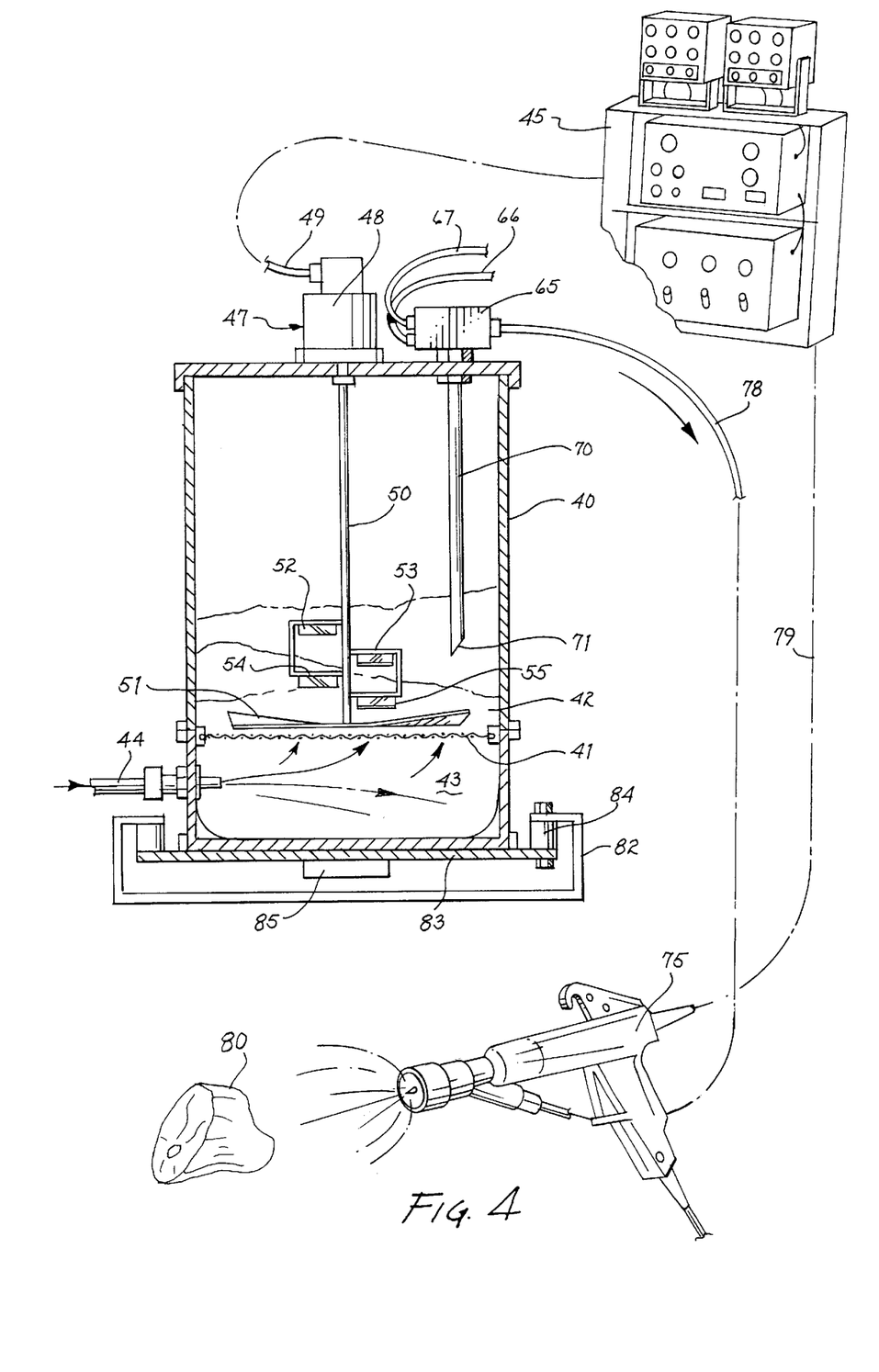
FIG. 4 is a schematic representation of an electrostatic coating system incorporating the teachings of the present invention.
Figure 5:
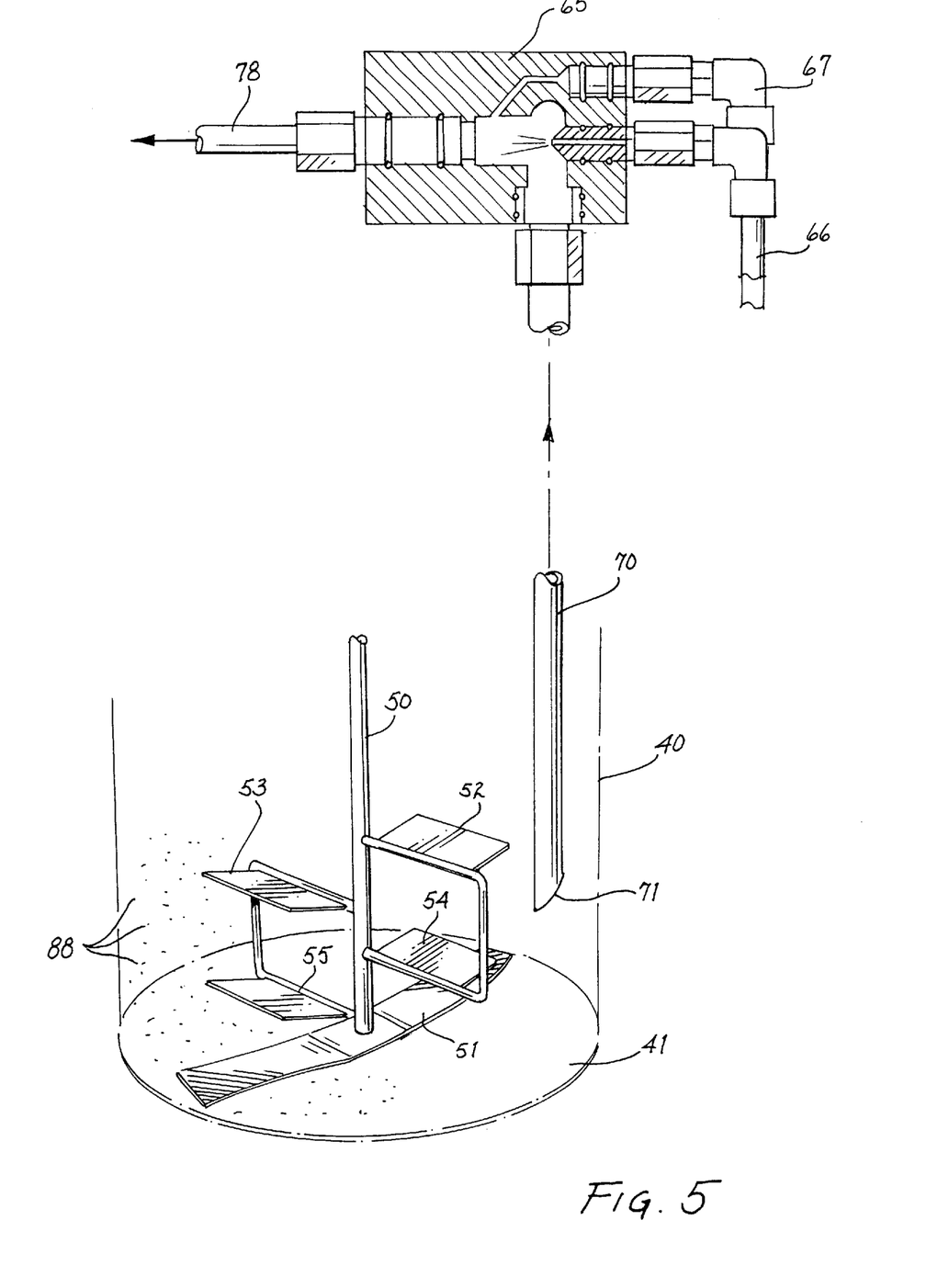
FIG. 5 is an enlarged view of a portion of the system of FIG. 4 showing the interior of the hopper in perspective view and showing the venturi pump in cross-section.

As stated previously, the target contains surfaces that are positive with respect to the negatively charged particles thus attracting the charged particles to the target surfaces until the surfaces are completely coated. The simplified description of an electrostatic coating process, described in connection with FIG. 3, has been improved to facilitate electrostatic coating uses in the coating of food items with an edible electrostatic material. Referring now to FIG. 4, a schematic representation of an electrostatic coating system is shown incorporating the teachings of the present invention. A hopper 40 is shown supporting a fluidizing plate 41 which in turn supports a quantity of coating material such as a powder 42. The fluidizing plate 41 is a microporous plate known in the art which supports the particles of the material 42 while nevertheless permitting air under pressure to be admitted from a chamber 43 beneath the plate through the micropores in the plate into the quantity of material being supported thereby. Air admitted to the chamber 43 is supplied through a conduit 44 and is controlled by a multi-function controller 45. The air, flowing through the microporous plate 41 exits upwardly into the quantity of material 42 and "fluidizes" the material such that the particles of material are elevated and mixed with the airstream. In the system of the present invention, an agitator system 47 is provided to facilitate the fluidizing of the coating material. The agitator system includes a pneumatic motor 48 driven by a source of air under pressure through a tube 49; the pressurized air to provide the driving force for the agitator motor 48 is again controlled by the controller 45.

The agitator 47 includes a rotating shaft 50 to which is connected an agitator blade 51 and a plurality of lifting blades 52–55. The agitator may best been seen by reference to FIGS. 6, 7 and 8 wherein it may be seen that the shaft 50 is connected to the agitator blade 51 which incorporates a generally rectangular central section 56 and gently tapered end sections 57 and 58. In the embodiment chosen for illustration, the end sections 57 and 58 are twisted with respect to the center section and thereby inclined with respect to the plane of the fluidizing plate 41 through an angle α of thirty degrees. The rotation of the agitator blade thus has the function of stirring and lifting the quantity of coating material positioned closely to the fluidizing plate within the hopper.

Figures 6, 7:
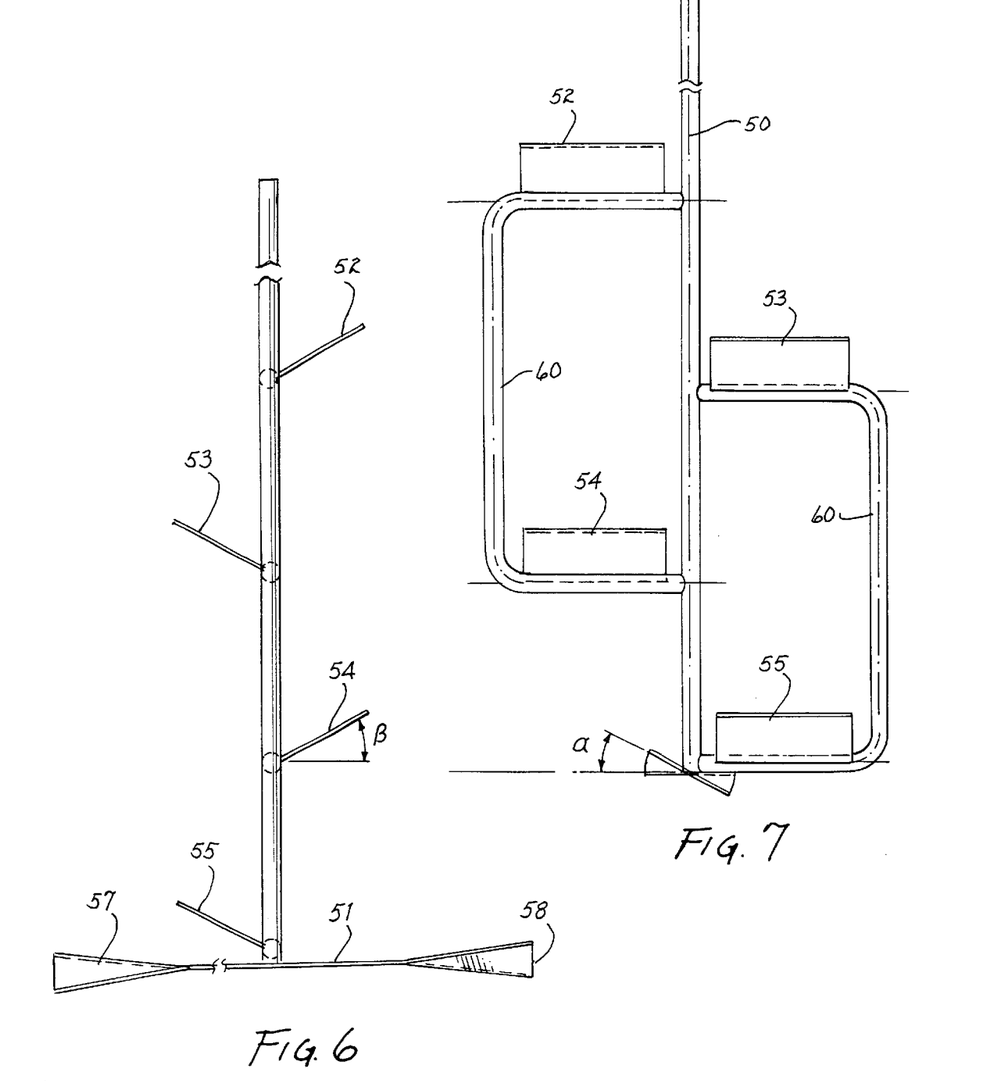
FIG. 6 is a side elevational view of the agitator system used in the hopper of the present invention.
FIG. 7 is a front elevational view of the agitator system of FIG. 6.
Figure 8:
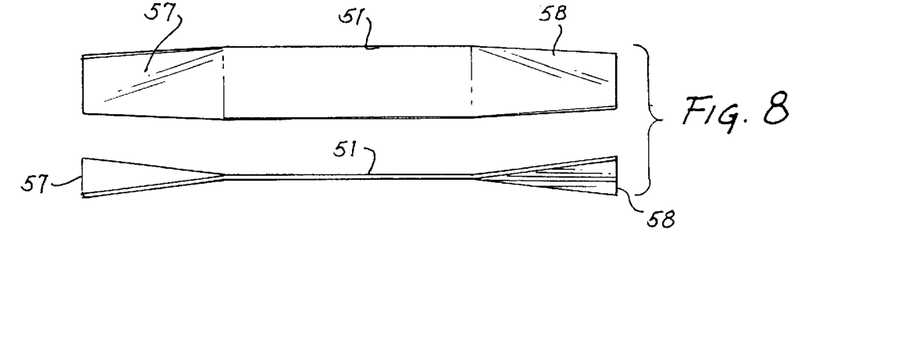
FIG. 8 is a top and side elevation view respectively of the agitator blade used in the agitator system in the present invention.

Working in conjunction with the agitator blade, are a plurality of lifting blades 52,53,54 and 55 which are mounted on supporting brackets 60 attached to the shaft 50. Each of the lifter blades 52–55 is angled upwardly on its respective bracket by an angle β of thirty degrees. Thus, each of the lifter blades 52–55 extends in a corresponding plane that is at an angle of approximately thirty degrees with respect to the fluidizing plate 41. The lifter blades are intended to impart an upward acceleration to the fluidized particles within the hopper 40. In the embodiment chosen for illustration, the lifter blades are arranged in pairs, 52–53 and 54–55. Each blade of a pair extends radially from the shaft in an opposite direction with respect to the other blade of the pair; further, the blades of the pair are staggered longitudinally of the shaft 50. Thus, lifter blade 52 extends radially from the shaft 50 in an opposite direction with respect to blade 53. Also, the blades 52 and 53 are staggered longitudinally of the shaft 50. The same description applies to the pair of lifter blades 54 and 55.

Returning now to FIG. 4, a venturi pump 65 is positioned on top of the hopper 40 and is provided with primary and secondary pressurized and filtered air through conduits 66 and 67, respectively. The control of the pressure of the primary and secondary pressurized air is provided by the controller 45. A venturi tube 70 extends from the venturi pump into the hopper 40 and terminates at one end thereof 71 at a strategic location within the hopper. The end 71 of the venturi tube 70 is positioned a predetermined distance above the fluidizing plate 41. The precise location of the end 71 may be determined empirically or may be calculated; however, it is intended that the end 71 of the venturi tube 70 be positioned at a strategic location within the hopper 40 such that the fluidized air density at that position be at a chosen density. When the fluidized material at that chosen density is combined with the primary and secondary air in the venturi pump, the resulting fluidized air that is provided to the application gun 75 is at the precise density required to permit the effective electrostatic charging of the particles for application to a target. The fluidized material having the proper density as determined by the position of the end 71 of the venturi tube 70, and as determined by the primary and secondary air flow in the venturi pump 65, is supplied to the application gun 75 through conduit 78. The application gun 75 is provided with electrical power from the controller 45 over conductor 79. The gun creates a corona discharge through which the airborne particles of coating material pass. The particles each collect a negative charge and are directed by the escaping airstream in which they are entrained toward the target. The coating material is an edible substance such as gelatin powder, the charged particles of which are attracted to a food target item such as a cut-face ham 80.

The hopper 40 is supported on a platform 82 which may contain legs depending therefrom (not shown in FIG. 4); the platform may in turn support a mounting plate 83 that is mechanically insulated from the platform 82 through the use of rubber bushings such as those shown at 84. A pneumatically operated vibrator 85 is attached to the mounting plate 83 and is supplied with air under pressure from the controller 45. The vibrator is well known in the prior art and is used to vibrate the hopper 40 to assist in the fluidization of the material in the hopper by imparting acceleration to the particles of the material when they contact the fluidizing plate or the walls of the hopper 40.

The charged particles emanating from the application gun 75 are directed by the airstream into the vicinity of the target. The electrostatic attraction of the target causes the individual negatively charged particles to be attracted to the target surfaces. When the density of the fluidized material is stabilized in the hopper 40 at a proper value, the amount of material being applied to a target is determined by the time that the fluidized material flows from the application gun. Thus, if a predetermined amount, usually stated in grams, is required for appropriate coating of a target, that amount of coating material will be delivered in a predetermined time. The time to apply the desired amount of coating material may be determined empirically for a given target and a given material; thereafter, the controller is calibrated to supply pneumatic pressure through the application gun for only the time required to deliver the predetermined amount of coating material for each cycle. Thus, successive targets are subjected to a precisely controlled amount of coating material during the corresponding coating cycle. The targets are typically presented to the application gun by way of a conventional conveyor system (not shown). While it has been found that it is important to accurately control the quantity of edible coating material to insure the proper coating of a food product item, it is also important to avoid events such as excessive overspray and/or accumulation of the coating material on processing equipment. Unlike prior art systems, such events result in the establishment of breeding environments for bacteria, an unacceptable condition in a food processing plant. Accordingly, I have determined that an overspray of less than three percent of the predetermined amount of coating material is desirable but that no more than five percent overspray can be tolerated. To insure compliance with this range of coating material quantity, the controller functions to shut off the pneumatic pressure rapidly and precisely at the end of each coating cycle.

The controller 45 comprises conventional components for providing filtered pressurized air to the hopper 40 and provides electrical power to the application gun 75 to permit the generation of an appropriate corona field for charging the particles of the coating material. Typically, the primary air is adjustable and is generally set to provide filtered pressurized air at a pressure of from 25 to 30 psi. Similarly, the secondary air is customarily set to 10 to 15 psi. Both the primary air and secondary air are delivered to the venturi pump 65 and can be turned on and rapidly shut off for predetermined time intervals. The timed intervals permit the precise control of the amount of fluidized material supplied to the application gun 75 and therefore supplied to a target. The controller also supplies pressurized air to operate the pneumatic agitator motor 47 as well as the pneumatic vibrator 85. It may be noted that all of the connections between the controller and the hopper are pneumatic; that is, no electrical connections are made to the hopper to avoid the possibility of stray fields that could affect the proper fluidization of the material. The controller also supplies fluidizing air through the conduit 44 to the air chamber 43; the fluidizing air is generally adjusted to a pressure of from 5 to 15 psi.

The application gun 75 is positioned to direct the charged particles of the coating material emanating therefrom into the vicinity of the target. The precise positioning of the application gun as well as the distance from the gun to the target is determined by the combination of several variables including the pressure of the air being supplied to the gun to carry the charged particles, the specific coating material being used as well its specific gravity, the density of the fluidized material, the voltage used to derive the corona discharge for charging the particles of the coating material, and the nature of the target surfaces to be coated. Typical food production items to be coated will require that the application gun be located from two to six inches from the target item.

Referring to FIG. 5, the coating system of the present invention is shown in a more pictorial view and is useful in describing the operation of the system. The hopper 40 includes the agitator shaft 50 which rotates the agitator blade 51 and the lifting blades 52–55. The rotation of the agitator shaft 50 causes the "stirring" and lifting of the particles, such as those shown at 88, while upwardly flowing air through the fluidizing plate 41 cooperates with the agitator and lifting blades to facilitate fluidizing of the coating material. Once the fluidizing process within the hopper 40 stabilizes, the density of the material is not uniform throughout the hopper; rather, there results a gradation throughout the hopper 40 with the denser air/particle medium being closer to the fluidizing plate while the less dense material may be found toward the top of the hopper 40. The venturi tube 70 is positioned so that the end 71 thereof is at a predetermined distance above the fluidizing plate 41 in a location having the desired fluidized material density to be withdrawn from the hopper. The material, of the desired density, is thus withdrawn from the hopper 40 by the venturi pump 65 through the venturi action created by primary air provided to the venturi pump 65 through conduit 66 in a manner well known in the art. To provide fine adjustment to the density of the fluidized material being supplied to the application gun, secondary air is supplied to the venturi pump through conduit 67. This secondary air, of a lower pressure than the primary air, is mixed with the fluidized material after it is withdrawn from the hopper 40 and prior to the material exiting the venturi pump. The fluidized material, of the precise density, is thus supplied to the application gun over the conduit 78.

The fluidizing of the material within the hopper requires sufficient time to permit the fluidizing to stabilize within the hopper. Thus, as the agitator system rotates the corresponding agitator and lifting plates, and as the vibrator vibrates the hopper and the fluidizing air passes through the fluidizing plate, the material gradually becomes fluidized to assume a steady state wherein the density of the material does not significantly change but is denser toward the bottom of the hopper. It has been found that in using of the process of the present invention in production, it is of substantial benefit to subject the material within a hopper to a pre-fluidizing step. That is, the material is loaded into a prefluidizing hopper, and the vibrator/agitator system and fluidizing air are permitted to fluidize the material until it reaches a stable gradation of densities. At that time, the hopper is disconnected from its source of fluidizing air and pneumatic power for operating the agitator system to permit the hopper to be moved from a prefluidizing station to an operating station where it is again connected to a source of fluidizing air, pneumatic pressure for operation of the agitator system, and to primary and secondary air for the venturi pump. The fluidizing process may then be restarted and the stabilized gradation of material density achieved rapidly. To permit the prefluidizing step, the system of the present invention incorporates quick-disconnect couplers in selected pneumatic conduits.

Figure 9:
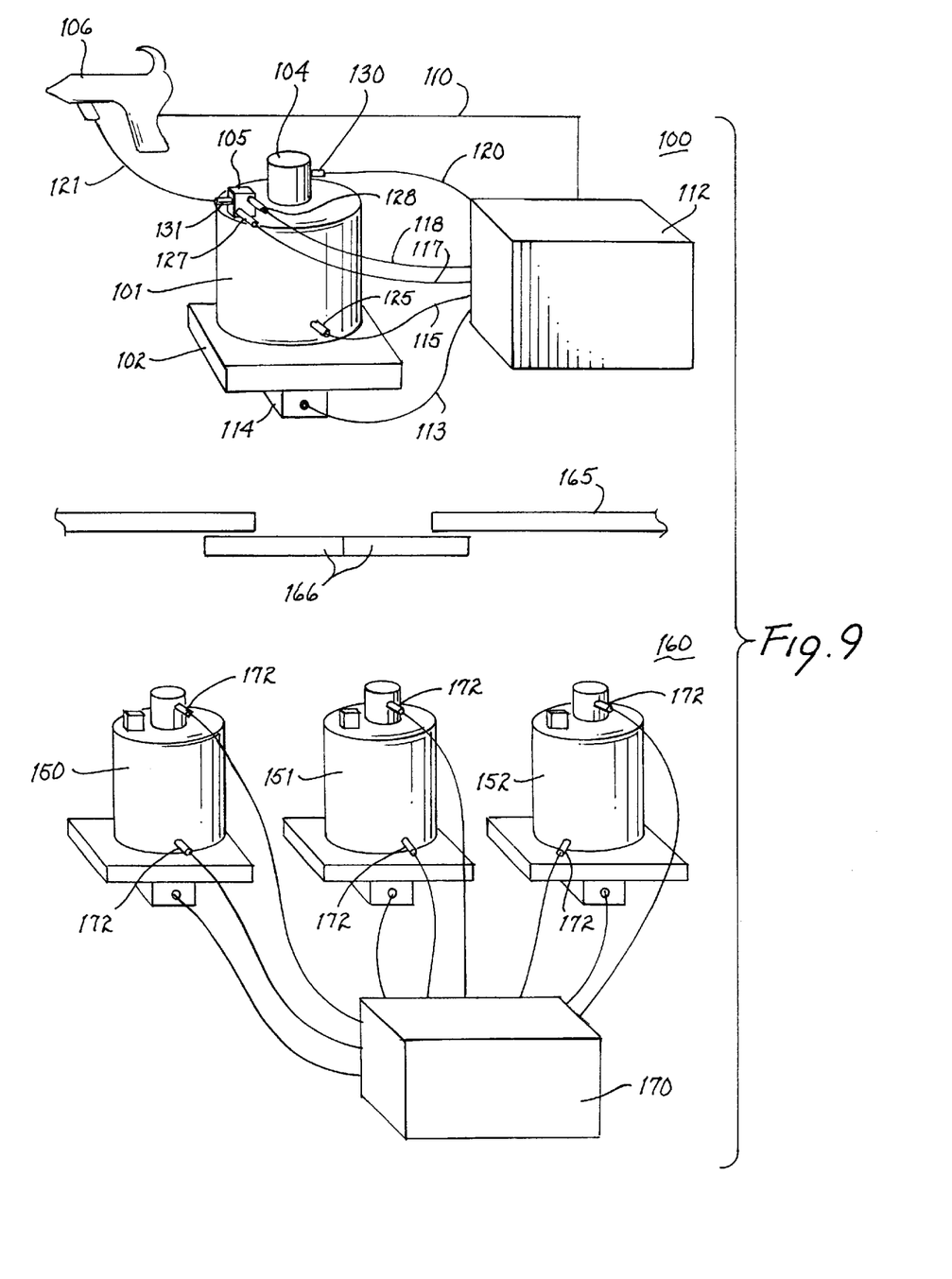
FIG. 9 is a schematic illustration of an electrostatic coating system incorporating the teachings of the present invention showing the system as it would appear in the operation of a production facility wherein targets are coated with electrostatically charged particles of an edible coating material.

Referring to FIG. 9, a schematic illustration of an electrostatic coating system incorporating the teachings of the present invention is shown wherein a prefluidizing step is incorporated in the production facility. A food processing room 100 is schematically shown wherein a hopper 101 containing a selected coating material is positioned on a platform 102. The hopper 101 is similar to that described previously and includes a pneumatically operated agitator system 104, a venturi pump 105 and an application gun 106. Electrical power is supplied to the application gun through electrical conductor 110 while the controller 112 provides pneumatic pressure through conduct 113 to a pneumatically operated vibrator 114. Similarly, the controller 112 provides pressurized air through conduit 115 to the fluidizing chamber of the hopper 101 and supplies primary and secondary air through conduits 117 and 118 respectively, to the venturi pump 105. Pneumatic pressure is provided by the controller 112 through conduit 120 to the pneumatically driven agitator motor of the agitator system 104. The venturi pump 105 is connected to the application gun 106 through conduit 121.

It may be noted that each of the conduits 115,117,118,120 and 121 are connected to the appropriate locations on the hopper 101 by quick-disconnect couplers 125, 127, 128, 130 and 131, respectively. It has been found that appropriate quick-disconnect couplers are available through a variety of sources and may be obtained from companies such as Alkon that provide couplers such as their AB94-D chrome plated brass quick-disconnect couplers. Other types of quick-disconnect systems may be used.

The hopper 101 is located in a system that is operating within a food processing room 100. The prefluidizing step may readily be provided by positioning substitute hoppers 150, 151 and 152 located in an adjacent area 160 that is physically separated from the food processing room 100. The separation of the areas for production and for prefluidization is shown schematically in FIG. 9 as a wall 165 and doors 166. The hoppers 150, 151 and 152 have been loaded with suitable coating material and are operating under the control of prefluidizing controller 170. Each of these hoppers is thus being subjected to vibration through pneumatic vibrators, is being provided with fluidizing air into the respective fluidizing chambers, and pressurized air for their respective agitator systems. The material in each of the hoppers 150, 151 and 152 is thus being fluidized in a manner similar to that described above. Connection to the fluidizing air supply as well as connection to the pneumatic agitator motors are provided through quick disconnect couplers 172. Thus, the fluidizing of the coating material proceeds in the prefluidizing step and is readily made available to the food coating process by quick disconnecting the appropriate pneumatic conduits from the corresponding hopper and transporting that hopper to the food processing room 100 where the hopper is substituted for the hopper 101.

It has been found that the ideal particle size for correct fluidization for coating foods with edible coating material is approximately 120 microns. It has also been found that larger particles have too much momentum and pass through the corona field too quickly to pick up a complete charge or have too much momentum to change direction and appropriately seek the target surface. Particles that are smaller tend to have insufficient momentum to travel through the corona field and to remain on a trajectory in the direction of the target. Particle sizes in the range of 90 to 150 microns may successfully be used, although the ideal size is 120 microns. A desired specific gravity for the particles of the edible coating material is in the range of 1.4 to 1.8. It is important for the coating material powder have a uniform particle size and conductivity. The mixing of powders is permissible; to accomplish certain properties for the finished food product being coated, two or more ingredients may be combined to form a single powder coating. Such mixing requires particular attention to the particle densities and particle sizes to avoid stratification of the different powders during the fluidization process.

Unlike electrostatic coating of material such as metals and the like, it is usually impossible to manually mask off any area of a food product item that is not required to be coated. It is therefore necessary to identify the properties of the coating material and the target to control the attraction process. In the case of food products such as meats and the like, the moisture content of the product can be used as an effective ground potential or positive target surface. The moisture or water acts as an attractive force to attract the electron bearing particles. Since such food products usually have irregular shapes, and have varying degrees of moisture content, the coating process must take into account the varying attractive forces caused by the varying degrees of moisture present on the target surfaces. It has been found that with products such as "cut-face hams" it is not only desirable but required to coat only the face of the ham and not the entire product.

An example of the use of the method of the present invention comprises the coating of a "cut-face hams" with an edible coating material. The powdered coating material was placed in a hopper as above described and was fluidized. The fluidized material was withdrawn from the hopper using a venturi pump and supplied to an application gun. A corona discharge was generated at the gun nozzle and the fluidized material was pneumatically forced through the field to charge the particles of the material. The stream of charged particles was directed to a cut-face ham; since the moisture content of the cut-face is greater than the remainder of the ham, the greater attraction of that surface caused the particles to be attracted thereto to coat the ham face. It was determined that the cut-face of the ham was properly coated with the edible coating material upon the release of 9.5 grams of coating material. Additional cut-face hams were then coated with the edible coating material by directing the charged particles emanating from the application gun onto the hams and releasing just the predetermined amount of material 9.5 grams −0.0+0.4 grams. Subsequent cut-face hams were properly coated by releasing just the required 9.5 grams at each subsequent cut-face ham. The result was that virtually no overspray was encountered and substantially all of the particles went directly to the cut-face of the ham. The resulting coated hams exhibit an electrostatically bonded edible coating adhering only to the open cut of the ham. This coating prevents purging of moisture from the face. The coated cut-face hams may then be packaged using presently known techniques such as sealed shrink packaging. The electrostatically bonded coating to the open face seals in the moisture at the face and prevents moisture escape in the form of purging which can be aesthetically undesirable and more importantly may also provide a breeding ground for any bacteria that might be present.

A second example of the method of the present invention also utilized cut-face hams as the target item. A different edible coating material having a smaller particle size was chosen as the coating material. A determination of the correct predetermined quantity of coating material was made as in the first example and was found to be 4.3 grams. Cut-face hams were then coated by successively directing the charged particles of the coating material emanating from the application gun to the individual cut-face hams. The quantity released during each cycle required for coating a ham was 4.3 grams −0.0+0.1 grams.

In both of the above examples, virtually no overspray was observed, and no latent organic powders that, left unchecked, could provide a growth medium for bacteria, accumulated. Cleanup of the workplace was relatively minimal.

A third example of the method of the present invention incorporated the utilization of prefluidization. The powdered coating required to appropriately coat the face of a cut-face ham was determined as in the first example. A stream of charged particles of the coating material was directed to the open face of the cut-face ham and the time required to supply the predetermined amount of coating material was noted. Subsequent cut-face hams were then coated with the edible coating material by directing the charged particles emanating from the application gun onto the hams for the period of time previously determined for supplying the predetermined amount of material. While the coating of the cut-faced hams was in process, a second hopper containing the same coating material, located in an adjacent room, was operated to fluidize the material within the second hopper. The prefluidization of the material in the second hopper was maintained for approximately one half hour during the processing of the cut-faced hams in the adjacent room. The processing of the hams was stopped, the controller in the processing room was turned off and the quick disconnect connections to the hopper were disconnected. The controller in the adjacent room was turned off and the second hopper was disconnected therefrom through the use of the quick disconnect couplers. The second hopper was then transported to the food processing room and connected to the controller and application gun in the processing room. The food processing room controller was then turned on and the second hopper permitted to continue fluidizing the material therein until the density gradation within the hopper stabilized; this stabilization occurred in less than five minutes, thereby permitting the coating process to continue with minimal interruption.

The prefluidization by using hoppers for prefluidizing the coating material permits continuous processes to be interrupted for only a short period for time rather than requiring a hopper to fluidize the material from its initial loading of coating material. These initial fluidization steps can require a significant time, sometimes as long as an hour. Thus, prefluidization combined with quick-disconnect connectors enables the process to continue with minimal interruption. The prefluidization in an isolated or separate area or room permits the efficient handling of the coating material including the loading of prefluidizing hoppers without risking the contamination of the processing room containing the food to be coated.

The present invention has been described in terms of selected specific embodiments of the apparatus and method incorporating details to facilitate the understanding of the principles of construction and operation of the invention. Such reference herein to a specific embodiment and details thereof is not intended to limit the scope of the claims appended hereto. It will be apparent to those skilled in the art that modifications may be made in the embodiments chosen for illustration without departing from the spirit and scope of the invention.

What is claimed is:

1. A method for coating a plurality of food products items with electrostatically charged particles of an edible coating material comprising:
    (a) predetermining the desired quantity of coating material required to coat a single food product item;
    (b) fluidizing an edible coating material;
    (c) pneumatically directing the fluidized material through an electric field to produce charged particles of the material;
    (d) directing the charged particles of the fluidized material to the food item to be coated;
    (e) ceasing pneumatically directing said particles through the electric field when said desired quantity, plus no more than five percent, has been directed through said electric field; and
    (f) repeating steps c through e for succeeding food product items.

2. The method of claim 1 wherein said fluidized material has a particle size of from 90 to 150 microns.

3. The method of claim 1 wherein said coating material has a specific gravity of from 1.4 to 1.8.

4. The method of claim 1 wherein said fluidized material has a particle size 120 microns.

5. The method of claim 1 wherein said fluidized material has a particle size of from 90 to 150 microns and the coating material has a specific gravity of from 1.4 to 1.8.

6. A method for coating a plurality of food product items with electrostatically charged particles of an edible coating material comprising:
    (a) predetermining the desired quantity of coating material required to coat a single food product item;
    (b) fluidizing a first quantity, greater than said desired quantity, of edible coating material and a first hopper located in a food processing room;

(c) fluidizing a second quantity, greater than said desired quantity, of edible coating material in a second hopper located outside of said food processing room, the fluidizing of said second quantity occurring while fluidizing said first quantity;

(d) pneumatically directing the fluidized material from said first hopper through an electric field to produce charged particles of the material;

(e) directing the charged particles of the fluidized material to the food item to be coated;

(f) ceasing pneumatically directing said particles through the electric field when said desired quantity, plus no more than five percent, has been directed through said electric field;

(g) repeat steps (d), (e) and (f) for succeeding food product items;

(h) removing said first hopper and replacing it with second hopper;

(i) pneumatically directing the fluidized material from said second hopper through an electric field to produce charged particles of the material;

(j) directing the charged particles of the fluidized material to the food item to be coated;

(k) ceasing pneumatically directing said particles through the electric field when said desired quantity, plus no more than five percent, has been directed through said electric field; and (l) repeating steps (i) through (k) for succeeding food product items.

7. The method of claim 6 wherein said fluidized material has a particle size of from 90 to 150 microns.

8. The method of claim 6 wherein said coating material has a specific gravity of from 1.4 to 1.8.

9. The method of claim 6 wherein said fluidized material has a particle size of 120 microns.

10. The method of claim 6 wherein said fluidized material has a particle size of from 90 to 150 microns and the coating material has a specific gravity of from 1.4 to 1.8.

11. A method for coating a plurality of food product items with electrostatically charged particles of an edible coating material comprising:

(a) predetermining the desired quantity of coating material required to coat a single food product item;

(b) fluidizing a first quantity, greater than said desired quantity, of edible coating material and a first hopper located in a food processing room;

(c) fluidizing a second quantity, greater than said desired quantity, of edible coating material in a second hopper located outside of said food processing room, the fluidizing of said second quantity occurring while fluidizing said first quantity;

(d) pneumatically directing the fluidized material from said first hopper through an electric field to produce charged particles of the material;

(e) directing the charged particles of the fluidized material to the food item to be coated;

(f) ceasing pneumatically directing said particles through the electric field when said desired quantity, plus no more than three percent, has been directed through said electric field;

(g) repeat steps (d), (e) and (f) for succeeding food product items;

(h) removing said first hopper and replacing it with second hopper;

(i) pneumatically directing the fluidized material from said second hopper through an electric field to produce charged particles of the material;

(j) directing the charged particles of the fluidized material to the food item to be coated;

(k) ceasing pneumatically directing said particles through the electric field when said desired quantity, plus no more than three percent, has been directed through said electric field; and (l) repeating steps (i) through (k) for succeeding food product items.

12. Apparatus for applying electrostatically charged particles of an edible coating material to a surface of a food product item comprising:

(a) a hopper for containing coating material, said hopper including a fluidizing plate for supporting a quantity of said material, an agitator blade and a lifting blade for agitating and lifting said material to assist in fluidizing the material;

(b) a source of pressurized fluidizing air connected to said hopper for travel through said fluidizing plate;

(c) a feed tube extending into said hopper and having an end thereof positioned a predetermined distance above said fluidizing plate to permit the withdrawal from said hopper of fluidized material at a selected density;

(d) a venturi pump connected to an opposite end of said feed tube to withdraw fluidized material from said hopper; and (e) an application gun having means for creating a corona discharge and connected to receive fluidized material from said venturi pump, said gun directing said fluidized material through said corona discharge to produce charged particles of coating material and directing said charged particles toward a food product item surface.

13. Apparatus for applying electrostatically charged particles of an edible coating material to a surface of a food product item comprising:

(a) a hopper for containing coating material, said hopper including a fluidizing plate for supporting a quantity of said material, an agitator blade and a lifting blade for agitating and lifting said material to assist in fluidizing the material;

(b) a first source of pressurized air connected to said hopper for travel through said fluidizing plate;

(c) a feed tube extending into said hopper and having an end thereof positioned a predetermined distance above said fluidizing plate to permit the withdrawal from said hopper of fluidized material at a selected density;

(d) a second and a third source of pressurized air for providing primary and secondary air respectively;

(e) a venturi pump connected to receive said primary and secondary air and connected to an opposite end of said feed tube to withdraw fluidized material from said hopper; and (f) an application gun having means for creating a corona discharge and connected to receive fluidized material from said venturi pump, said gun directing said fluidized material through said corona discharge to produce charged particles of coating material and directing said charged particles toward a food product item surface.

14. The apparatus set forth in claim 13 including quick disconnect connectors connecting said first source of pressurized air to said hopper, and said second and third sources of pressurized air to said venturi pump respectively.

15. In an apparatus for applying electrically charged particles of an edible coating material to a surface of a food product item to be coated, an improved fluidizing hopper comprising:

(a) a container having a removable top and a bottom for receiving and fluidizing a quantity of coating material;

(b) a microporous fluidizing plate mounted above said bottom to define a chamber between said plate and bottom;

(c) an agitator motor mounted on said top for rotating an agitator shaft extending from said motor toward said plate;

(d) an agitator blade secured to said shaft for rotation therewith, said agitator blade positioned adjacent said plate so that when said agitator blade rotates it sweeps close to said plate; and (e) a plurality of lifting blades secured to said shaft for rotation therewith and positioned between said agitator blade and the top of said container.

16. The combination set forth in claim 15 wherein said agitator blade includes an upwardly inclined surface that imparts an upward acceleration to particles of coating material in the hopper when said agitator blade is rotated.

17. The combination set forth in claim 15 wherein said lifting blades are inclined with respect to said fluidizing plate to impart an upward acceleration to particles of coating material in the hopper when said lifting blades are rotated with said shaft.

18. The combination set forth in claim 15 wherein said lifting blades are arranged in pairs with each blade of a pair extending radially from said shaft in an opposite direction with respect to the other blade of said pair and is staggered longitudinally of said shaft with respect to the other blade of the pair.

19. The combination set forth in claim 16 wherein the inclined surface of said agitator blade is inclined at an angle of thirty degrees with respect to said plate.

20. The combination set forth in claim 17 wherein said lifting blades are inclined at an angle of thirty degrees with respect to said fluidizing plate.

21. An improved fluidizing hopper comprising:

(a) a container having a removable top and a bottom for receiving and fluidizing a quantity of coating material;

(b) a microporous fluidizing plate mounted above said bottom to define a chamber between said plate and bottom;

(c) an agitator motor mounted on said top for rotating an agitator shaft extending from said motor toward said plate;

(d) an agitator blade secured to said shaft for rotation therewith, said agitator blade positioned adjacent said plate so that when it rotates it sweeps close to said plate, said agitator blade including an upwardly inclined surface that is inclined with respect to said plate that imparts an upward acceleration to particles of coating material in the hopper when said blade is rotated; and (e) a plurality of lifting blades secured to said shaft for rotation therewith and positioned between said agitator blade and the top of said container, said lifting blades arranged in pairs with each blade of a pair positioned radially from said shaft opposite the other lifting blade of said pair, said blades inclined with respect to said agitator shaft to impart upward acceleration to particles of coating material in the hopper when said shaft is rotated.

\* \* \* \* \*